United States Patent [19]

Yamane

[11] Patent Number: 5,531,510
[45] Date of Patent: Jul. 2, 1996

[54] HUB MECHANISM FOR A BICYCLE

[75] Inventor: Takuro Yamane, Sakai, Japan

[73] Assignee: Shimano Inc., Osaka, Japan

[21] Appl. No.: 234,415

[22] Filed: Apr. 28, 1994

[30] Foreign Application Priority Data

Apr. 30, 1993 [JP] Japan .................. 5-023008 U

[51] Int. Cl.⁶ .................................. B60B 27/06
[52] U.S. Cl. .................... 301/110.5; 301/124.2
[58] Field of Search ................... 301/105.1, 110.5,
301/110.6, 124.2, 137; 192/46, 64

[56] References Cited

U.S. PATENT DOCUMENTS 2,280,936  4/1942  Swanson .................. 301/110.5 X
5,165,792  11/1992  Phillips .................... 301/110.5

FOREIGN PATENT DOCUMENTS 547175  12/1922  France ..................... 301/110.5
463953  8/1952  Italy ....................... 301/124.2

*Primary Examiner*—Russell D. Stormer
*Attorney, Agent, or Firm*—Dickstein, Shapiro & Morin

[57] ABSTRACT

A hub mechanism attachable to a bicycle frame includes a hub spindle having contact portions for contacting the frame to be fixed to the frame. The hub spindle includes small diameter portions disposed in axially opposite end regions thereof, respectively, and a large diameter portion disposed between the small diameter portions and having a substantially larger diameter than the small diameter portions. The hub mechanism further includes a hub rotatably supported by the hub spindle, and a bearing mechanism disposed between the hub spindle and the hub for allowing rotation of the hub relative to the hub spindle. The bearing mechanism includes a pair of ball bearings disposed on the small diameter portions of the hub spindle, respectively, and receivers disposed between the ball bearings and the hub spindle for receiving the ball bearings, respectively. Each of the receivers includes an extension extending to the large diameter portion of the hub spindle and engaging a periphery of the large diameter portion.

19 Claims, 3 Drawing Sheets

HUB MECHANISM FOR A BICYCLE

BACKGROUND OF THE INVENTION

1. FIELD OF THE INVENTION

The present invention relates to a hub spindle for supporting a wheel between fork ends of bicycle frames.

2. DESCRIPTION OF THE RELATED ART

A hub mechanism for a bicycle includes a hub spindle fixed to fork ends of a bicycle frame, and a hub rotatably supported by the hub spindle usually through a bearing mechanism. A conventional hub spindle has substantially the same diameter at opposite ends and in intermediate positions thereof, as shown in Japanese Utility Model Publication Kokai No. 4-107101, for example. The bearing mechanism used in the above hub mechanism includes ball pressers mounted on the hub spindle. Each ball presser is a short element disposed adjacent a ball bearing as seen in the above publication.

SUMMARY OF THE INVENTION

An object of the present invention is to provide a hub mechanism having a hub spindle formed stronger than in the prior art without enlarging the bearings. The above object is fulfilled, according to the present invention, by a hub mechanism comprising a hub spindle having contact portions formed integrally therewith for contacting a bicycle frame to be fixed to the frame, the hub spindle including small diameter portions disposed in axially opposite end regions thereof, respectively, and a large diameter portion disposed between the small diameter portions and having a substantially larger diameter than the small diameter portions. The hub mechanism further comprises a hub rotatably supported by the hub spindle, and bearing means disposed between the hub spindle and the hub for allowing rotation of the hub relative to the hub spindle.

According to this construction, the hub spindle has a large diameter portion to be stronger than a hub spindle having no large diameter portion. The hub spindle further includes small diameter portions where bearings are mounted. This avoids enlargement of the entire hub mechanism.

In order to increase the strength of the entire hub mechanism, each of ball receivers or pressers constituting the bearings may include an extension extending to the large diameter portion and engaging the large diameter portion. With this construction, the small diameter portions of the hub spindle are reinforced by the ball pressers to provide additional strength for the hub mechanism. Such ball pressers distribute forces from a bicycle wheel over a large area of the hub spindle, thereby diminishing the possibility of damage to the hub spindle.

Further and other objects, features and effects of the invention will become more apparent from the following more detailed description of the embodiment of the invention taken with reference to the accompanying drawings.

DETAILED DESCRIPTION OF THE PREFERRED EMBODIMENT

A hub mechanism in a preferred embodiment of the present invention will be described next with reference to the drawings.

Figure 1:
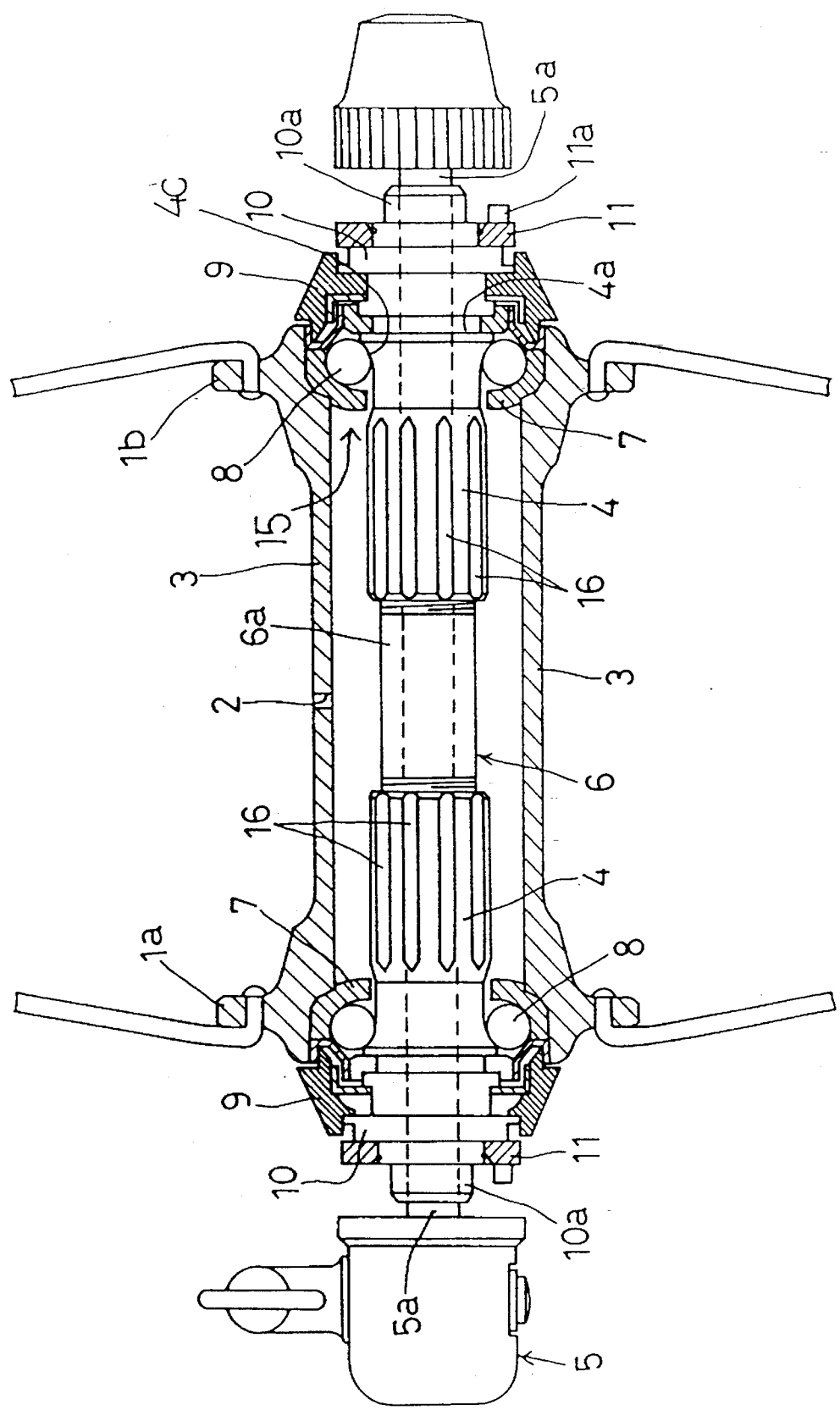
FIG. 1 is a view, partly in section, of a hub mechanism and related parts according to the present invention.

FIG. 1 shows a section of a hub 3 to illustrate the hub-mechanism according to the present invention. The hub 3 includes hub flanges 1a and 1b having spokes for supporting a bicycle wheel. Numeral 2, in FIG. 1 denotes a water drain bore. The hub 3 is rotatably supported on a hub spindle 6 through bearing devices 15. This embodiment includes a quick release 5 disposed at one end of the hub spindle 6. Each bearing device 15 includes an outer race 7, a ball bearing 8 and a ball presser 4. The ball presser 4 has a surface 4c for contacting the ball bearing 8. The ball bearing 8 is arranged between the surface 4c and outer race 7. Seal members 9 are arranged in opposite end portions of the hub spindle 6. The seal members 9 substantially cover spaces between the hub 3 and hub spindle 6 to prevent entry into the hub 3 of water, dust and the like.

The hub spindle 6 will be described next with reference to FIG. 2. The hub spindle 6 defines an axial bore 6d for receiving a hub rod 5a connected to the quick release 5. The ball pressers 4 are arranged in axially opposite end regions 6b of the hub spindle 6. Further, lock nuts 10 are screwed to opposite ends of the hub spindle 6. Each lock nut 10 has a steel seat 11 attached thereto. The seat 11 is retained on the lock nut 10 by a retainer ring 12.

Figure 4:
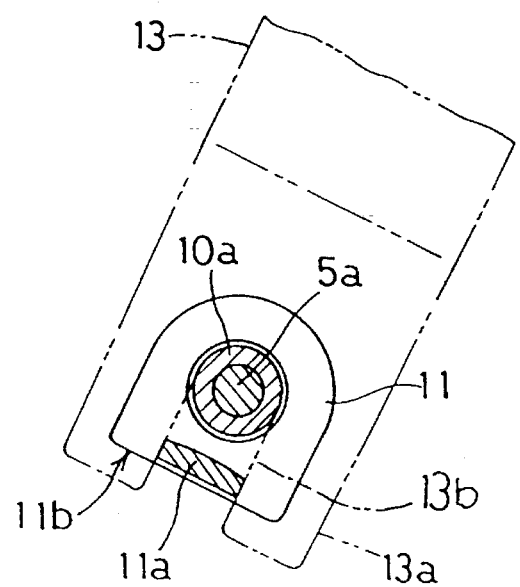
FIG. 4 is a view showing a position of a seat relative to a fork end.

The seat 11 includes a fixing projection 11a for fitting in a cutout 13b defined in a fork end 13a of a body frame 13 (FIG. 4). As shown in FIG. 4, the cutout 13b extends longitudinally of the fork end 13a to an extreme end thereof. The cutout 13b receives a coupling portion 10a of the lock nut 10 as well as the projection 11a of the seat 11.

With the coupling portion 10a of the lock nut 10 and the projection 11a of the seat 11 placed in the cutout 13b, the hub mechanism is fixed to the bicycle frame 13 by tightening the quick release 5.

Figure 2:
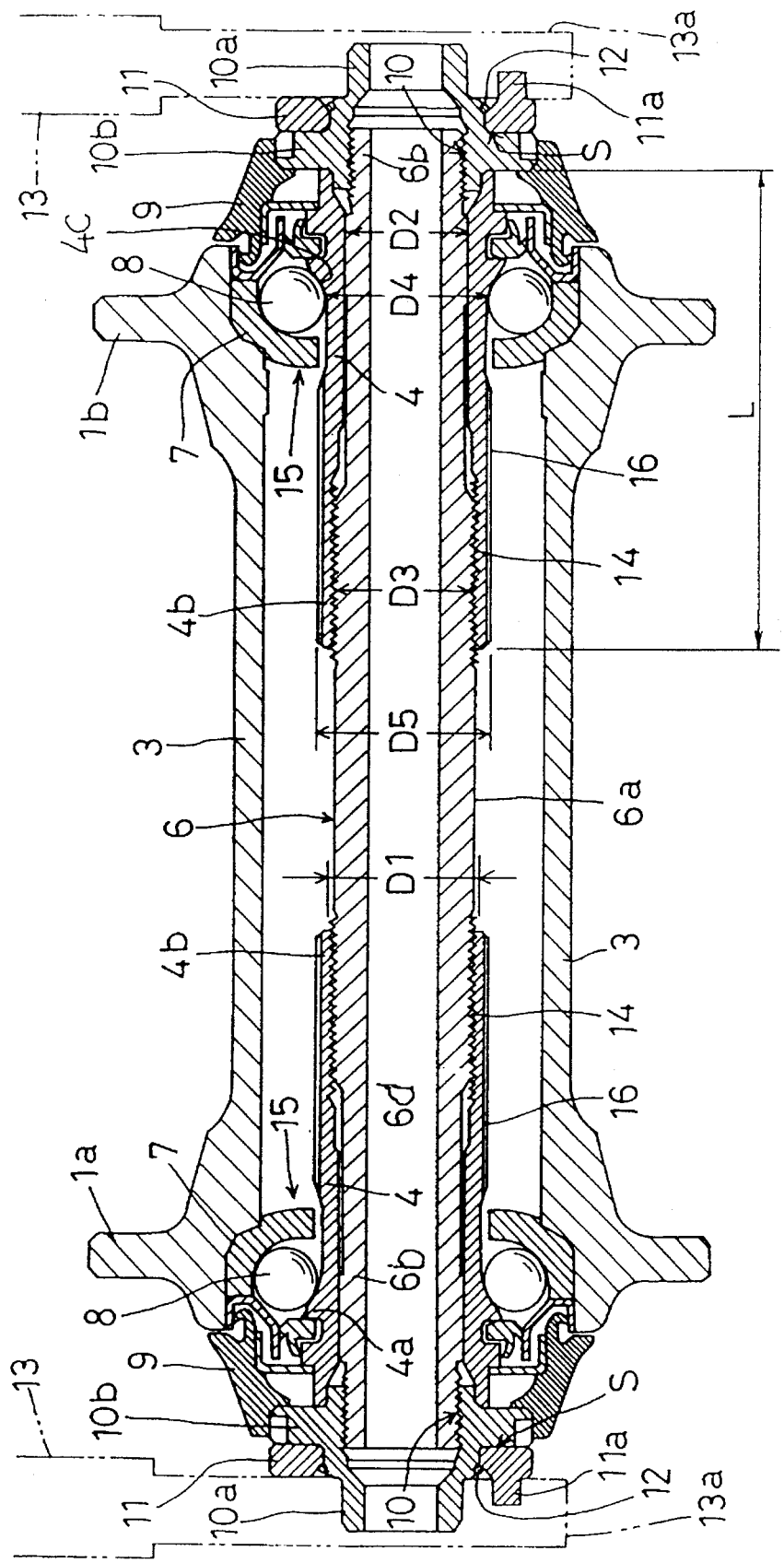
FIG. 2 is a sectional view taken through the axis of a hub spindle according to the present invention.

The hub spindle 6 has a tubular overall construction as seen in FIG. 2, which is formed of an aluminum alloy. Further, as seen, a middle region 6a of the hub spindle 6 has a diameter D1 substantially larger than a diameter D2 of the opposite end regions 6b. Specifically, in the preferred embodiment, diameter D1 is larger than diameter D2 by about 15%, or at least 10%.

The middle region 6a is located between the pair of ball bearings 8, and preferably has an axial length at least one third of the total length of the hub spindle 6.

Each ball presser 4 receives and contacts the ball bearing 8 in the end region 6b. The ball presser 4 has an axially outward end contacting the lock nut 10. The ball presser 4 includes an axially inward extension 4b extending toward the middle of the hub spindle 6. As shown in FIG. 2, the extension 4b overlaps a substantial portion of the middle region 6a of the hub spindle 6. In FIG. 2, reference L denotes an axial length of the ball presser 4. The extension 4b defines a threaded surface for meshing, in the overlapping area, with a threaded surface 14 formed peripherally of the middle region 6a of the hub spindle 6. Reference D3 in FIG. 2 denotes an inside diameter of the extension 4b of the ball presser 4. As noted hereinbefore, the ball presser 4 and ball bearing 8 combined with the outer race 7 constitute the bearing device.

The bore 6d of the hub spindle 6 has a constant diameter throughout the hub spindle 6, with the middle region 6a having large diameter D1 as noted above. Consequently, the middle region 6a has a large wall thickness to strengthen the hub spindle 6. However, the hub spindle 6 has reduced diameter D2 where the bearing devices 15 are mounted, to avoid enlargement of the bearing devices 15. The hub spindle 6, particularly small diameter portions thereof, is reinforced by the ball pressers 4 extending to the middle region 6a of the hub spindle 6, with the extensions 4b meshed with the middle region 6a. Preferably, the ball pressers 4 are formed of steel to be strong against wear due to contact with the ball bearings 8.

Figure 3:
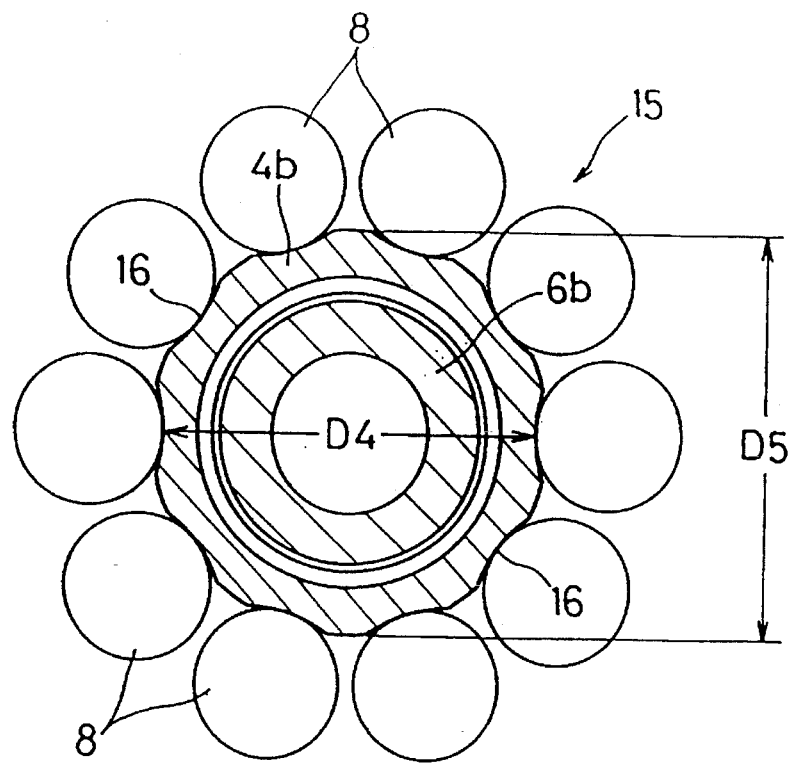
FIG. 3 is a sectional view of an extension of a ball presser, the hub spindle and a ball bearing.

As shown in FIG. 2, each ball bearing 8 contacts the surface 4c of the ball presser 4, which surface has an approximately conical shape to hold the ball bearing 8 with the outer race 7. In FIG. 2, a ball above the hub spindle 6 and a ball below the hub spindle 6 have a distance D4 therebetween. The extension 4b has a sectional shape as shown in FIG. 3. Specifically, the extension 4b has peripheral grooves 16 corresponding in number to the balls and extending axially of the extension 4b. The extension 4b has an outside diameter D5, and a diameter D4 where the grooves 16 are formed. Thus, the diameter D5 is larger than the diameter D4 to strengthen the extension 4b.

For inserting the ball presser 4 to place the extension 4b inside the hub 3, the ball presser 4 is pushed toward the middle of the hub 3 with the ball bearing 8 fitted in the grooves 16. Then, the grooves 16 may be moved past the ball bearing 8. To strengthen the ball presser 4, outside diameter D5 of the extension 4b preferably is larger than diameter D4. It is also possible to design the extension such that the diameter D5 is the same as or smaller than diameter D4.

Preferably, each lock nut 10 is formed of steel. This is considered effective to avoid wear and deformation of the lock nut 10 occurring when the coupling portion 10a of the lock nut 10 contacts the fork end 13a.

As shown in FIG. 2, each lock nut 10 has the seat 11 rotatably attached thereto. The seat 11 is retained on the lock nut 10 by the retainer ring 12. As shown in FIG. 4, the seat 11 is D-shaped as a whole. That is, the seat 11 includes a semicircular portion and a linear portion 11b. The seat 11 defines a bore substantially centrally thereof for receiving the coupling portion 10a of the lock nut 10. Further, the seat 11 includes the fixing projection 11a for fitting in the cutout 13b defined in the fork end 13a. When the hub mechanism according to the present invention is attached to the fork end 13a, the fixing projection 11a of the seat 11 is placed in the cutout 13b of the fork end 13a. Consequently, the linear portion 11b of the seat 11 always lies adjacent the free end of the fork end 13a.

When the hub spindle 6 is inclined relative to the fork end 13a during use of the bicycle, the linear portion 11b of the seat 11 contacts the fork end 13a. As a result, a force acting on the fork end 13a is distributed to the entirety of the linear portion 11b. This diminishes wear and damage of the fork end 13a.

In the above embodiment, each ball presser 4 is meshed with the hub spindle 6 in the middle region 6a of the latter. The ball presser 4 advantageously provides a strong reinforcement for the hub spindle 6, with the extension 4b of the ball presser 4 rigidly connected to the hub spindle 6. Alternatively, the hub spindle 6 may include a threaded portion adjacent each ball bearing 8, whereby the ball presser 4 meshes with the hub spindle 6 adjacent the ball bearing 8. In this case, the extension 4b of the ball presser 4 may have an inside diameter adapted for contacting the middle region 6a to reinforce the hub spindle 6.

The present invention is applicable also where the hub spindle 6 is formed of titanium or other light metal than an aluminum alloy. Further, the invention is applicable where the hub spindle 6 is formed of steel to give priority to strength over lightness.

It is also in accordance with the present invention to employ needle bearings in place of ball bearings 8.

The present invention is applicable to a rear wheel hub spindle as well as a front wheel hub spindle.

What is claimed is:

1. A hub mechanism attachable to a bicycle frame with a quick release mechanism comprising:
   a hub spindle supporting contact elements for contacting said frame to be fixed to said frame, said spindle defining a bore axially extending the entire length of said spindle for accommodating a part of said quick-release mechanism, said hub spindle including:
   small diameter portions disposed in axially opposite end regions thereof, respectively; and
   a large diameter portion disposed between said small diameter portions and having a substantially larger diameter than said small diameter portions;
   a hub rotatably supported by said hub spindle; and
   bearing means disposed between said hub spindle and said hub for allowing rotation of said hub relative to said hub spindle, said being means including:
   a pair of bearing members disposed on said small diameter portions of said hub spindle, respectively; and
   receivers disposed between said bearing members and said hub spindle for receiving said bearing members, respectively;
   each of said receivers including an extension extending to said large diameter portion and engaging a periphery of said large diameter portion.

2. A hub mechanism as defined in claim 1, wherein each of said bearing members comprises a plurality of balls.

3. A hub mechanism as defined in claim 1, wherein said bearing means further includes outer races attached to said hub.

4. A hub mechanism as defined in claim 1, wherein said extension substantially overlaps said large diameter portion, and is engaged with said large diameter portion.

5. A hub mechanism as defined in claim 2, wherein said extension has peripheral grooves corresponding in number to said balls and extending axially of said extension.

6. A hub mechanism as defined in claim 1, wherein each of said contact elements including engaged a lock nut with said hub spindle, and a seat attached to said lock nut.

7. A hub mechanism as defined in claim 6, wherein said lock nut includes an end position for placement in an engaging bore of a fork end of said frame.

8. A hub mechanism as defined in claim 6, wherein said seat includes a surface for contacting a side surface of a fork end of said frame, and a projection for insertion into an engaging bore formed in said fork end.

9. A hub mechanism as defined in claim 6, wherein said seat has a linear portion formed peripherally thereof.

10. A hub mechanism as defined in claim 1, wherein said large diameter portion has a length at least one third of an axial length of said hub spindle.

11. A hub mechanism as defined in claim 1, wherein said large diameter portion has an outside diameter larger than an outside diameter of said small diameter portions by at least about 10%.

12. A hub mechanism as defined in claim 11, wherein said large diameter portion has an outside diameter larger than an outside diameter of said small diameter portions by at least about 15%.

13. A hub mechanism as defined in claim 1, wherein said receivers are formed of a material having steel as a main component thereof.

14. A hub mechanism as defined in claim 1, wherein said hub spindle is formed of a material having aluminum as a main component thereof.

15. A hub mechanism attachable to a bicycle frame with a quick-release mechanism comprising:
   a hub spindle supporting contact elements for contacting fork ends to be fixed to said fork ends, respectively, said spindle defining a bore axially extending the entire length of said spindle for accommodating a part of said quick-release mechanism, said hub spindle including:
      small diameter portions disposed in axially opposite end regions thereof, respectively; and
      a large diameter portion disposed between said small diameter portions and having a substantially larger diameter then said small diameter potions;
   quick release means for fixing said hub spindle to said frame; and
   ball bearing means mounted on said small diameter portions of said hub spindle for allowing rotation of a hub relative to said hub spindle;
   said hub being supported by said hub spindle to be rotatable relative thereto through said ball bearing means.

16. A hub mechanism as defined in claim 15, wherein said ball bearing means includes a pair of sets of ball bearings disposed adjacent opposite ends of said hub spindle, and receivers for receiving said sets of ball bearings, respectively.

17. A hub mechanism as defined in claim 15, wherein said large diameter portion of sets of said hub spindle extends between said pair of ball bearings, said small diameter portions being disposed adjacent said ball bearing means.

18. A hub mechanism attachable to fork ends of a bicycle with a quick-release mechanism comprising:
   a hub spindle supporting contact elements for contacting said fork ends to be fixed to said fork ends, respectively said spindle defining a bore axially extending the entire length of said spindle for accommodating a part of said quick-release mechanism;
   a hub relatively rotatably supported by said hub spindle; and
   bearing means disposed between said hub spindle and said hub for allowing rotation of said hub relative to said hub spindle; said bearing means including:
      a pair of bearing members disposed adjacent opposite ends of said hub spindle, respectively; and
      receivers for receiving said bearing members, respectively;
   wherein said hub spindle includes opposite end regions disposed adjacent said pair of bearing members, respectively, and a middle region disposed between said pair of bearing members and having a substantially larger diameter than said end regions, each of said receivers including an extension extending to said middle region and engaging a periphery of said middle region.

19. A hub mechanism attachable to fork ends of a bicycle with a quick-release mechanism comprising:
   a hub spindle supporting contact elements for contacting said fork ends to be fixed to said fork ends, respectively, said spindle defining a bore axially extending the entire length of said spindle for accommodating a part of said quick-release mechanism;
   a hub rotatably supported by said hub spindle; and
   bearing means disposed between said hub spindle and said hub for allowing rotation of said hub relative to said hub spindle, said being means including:
      a pair of bearing members disposed in opposite end regions of said hub spindle, respectively; and
   receivers disposed between said baring members and said hub spindle for receiving said bearing members, respectively;
   wherein each of said receivers includes an axially outward end for contacting one of said contact portions and an axially inward extension extending to a middle region of said hub spindle and engaging a periphery of said middle region for distributing forces from said bearing means to said middle region and said contact portions.

* * * * *